Aug. 14, 1962    F. E. NELSON    3,049,378
SELF-LOADING AND UNLOADING VEHICLE
Filed Aug. 3, 1959    3 Sheets-Sheet 1

INVENTOR.
Floyd E. Nelson.
BY Fishburn and Gold
ATTORNEYS.

Aug. 14, 1962
F. E. NELSON
3,049,378
SELF-LOADING AND UNLOADING VEHICLE
Filed Aug. 3, 1959
3 Sheets-Sheet 2
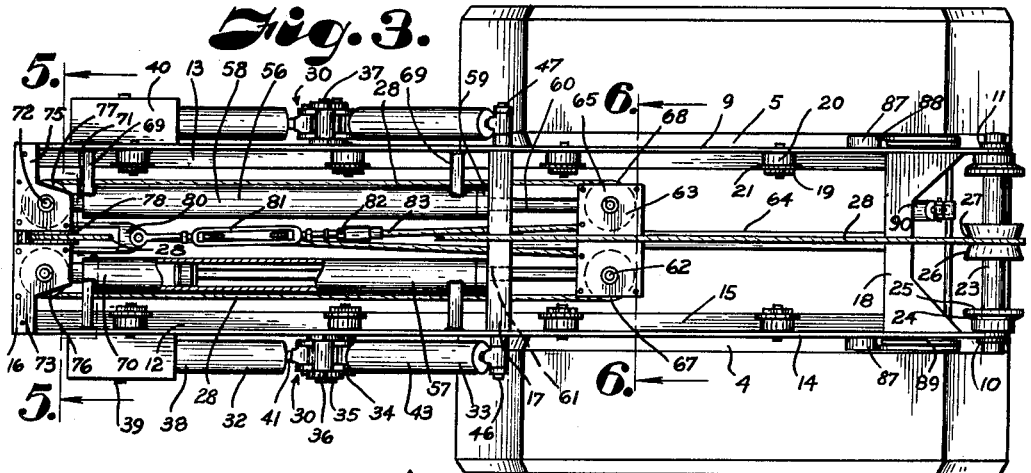
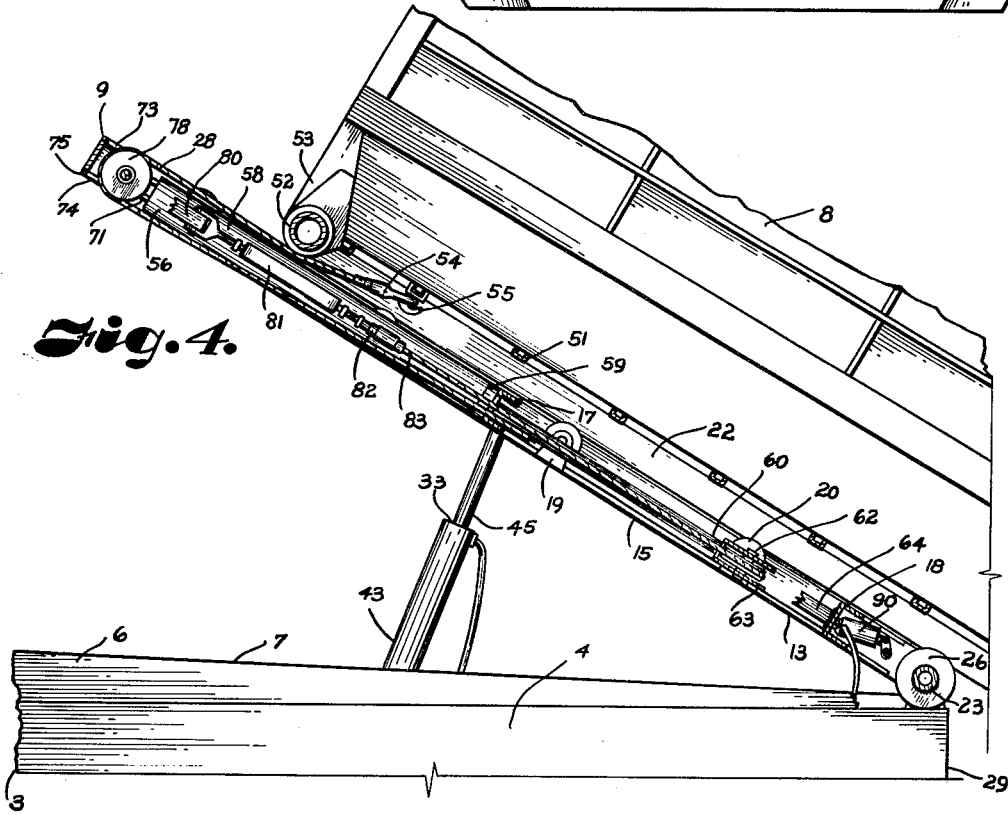
INVENTOR.
Floyd E. Nelson.
BY Fishburn and Gold
ATTORNEYS.

Aug. 14, 1962 F. E. NELSON 3,049,378
SELF-LOADING AND UNLOADING VEHICLE
Filed Aug. 3, 1959 3 Sheets-Sheet 3
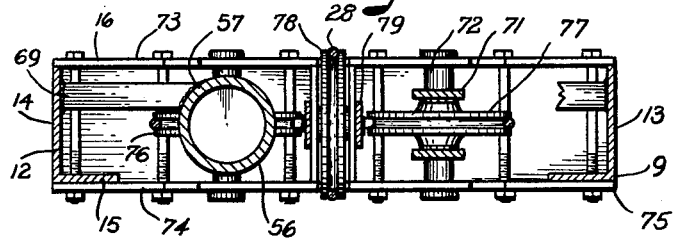
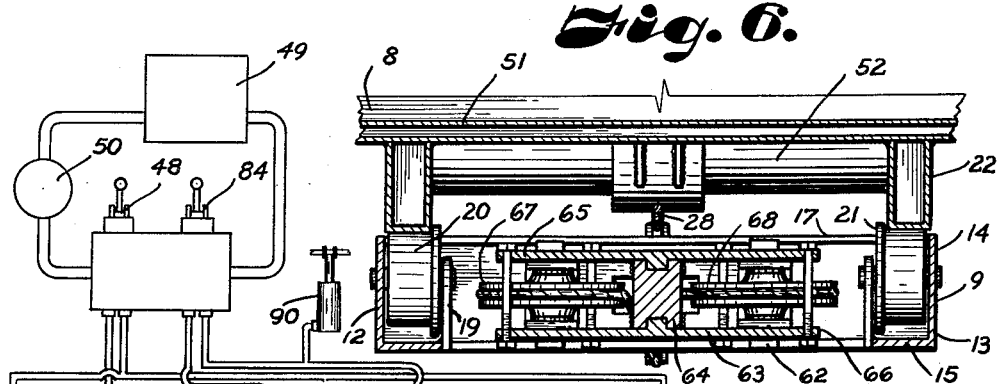
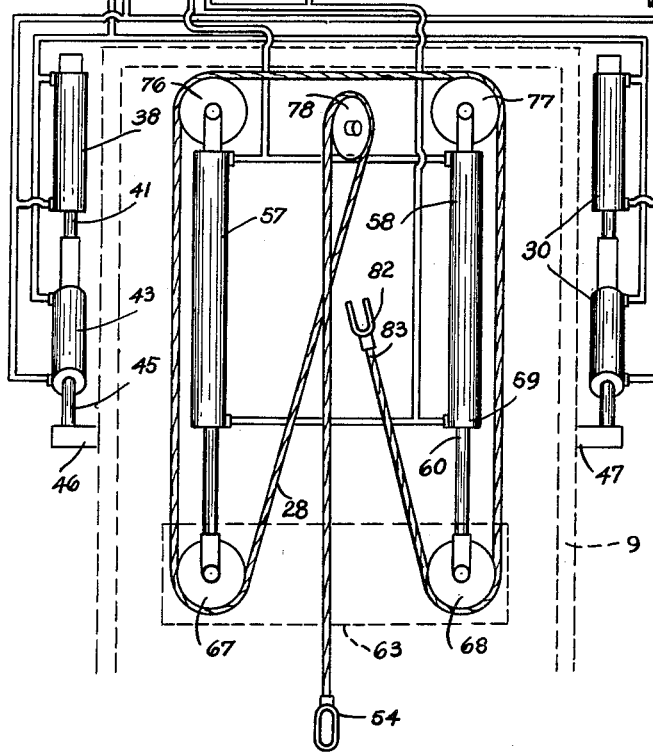
INVENTOR.
Floyd E. Nelson.
BY
Fishburn and Gold
ATTORNEYS.

United States Patent Office 3,049,378
Patented Aug. 14, 1962

3,049,378
SELF-LOADING AND UNLOADING VEHICLE
Floyd E. Nelson, % Sanitary Disposal Service Inc.,
110 Osage, Kansas City, Kans.
Filed Aug. 3, 1959, Ser. No. 831,250
6 Claims. (Cl. 298—14)

This invention relates to load-carrying equipment, and more particularly to self-loading and unloading vehicles such as trucks having removable bodies which may be bodily moved and loaded on the chassis, hauled to a destination and bodily unloaded or the body tilted to dump the contents therefrom as desired.

The invention generally contemplates a vehicle having a wheel-supported chassis, an elongate frame swingably mounted on said chassis for upward and downward swinging movement relative thereto, and a load member having sills removably mounted on the elongated frame and adapted to slide therefrom when said frame is tilted sufficiently, together with operating structure for tilting the elongated frame relative to the chassis and other operating structure for effecting movement of the body on and off of the vehicle and elongated frame thereon. It is desirable that consistent with suitable road clearance the structure be kept low whereby, when loaded, it will have a low center of gravity and thereby greater stability.

The principal objects of the present invention are to provide a vehicle chassis with a body tilting structure with an arrangement of extensible members such as hydraulic rams for effecting said body tilting while occupying a minimum of space in load-carrying position; to provide such a structure having articulated double-acting hydraulic rams arranged in pairs with one of a pair supplementing the movement of the other of said pair; to provide such a vehicle with power means for raising a body from the ground and drawing said body onto the vehicle chassis wherein the power means are extensible means with pulleys and a cable moved thereby; to provide such a structure wherein the extensible members are hydraulic rams carried by the elongate tiltable frame substantially within the height of the side members thereof; and to provide a self-loading and unloading vehicle with simple, positive, substantially fool-proof controls and operating mechanism for efficient, effective bodily movement of equipment and supporting structure and the unloading of contents by the bodily tilting of the load-carrying body thereof.

Other objects and advantages of this invention will become apparent from the following description taken in connection with the accompanying drawings wherein are set forth by way of illustration and example certain embodiments of this invention.

FIG. 3 is a plan view of the truck chassis and tilting frame with the load-containing body removed therefrom.

FIG. 4 is a partial side elevation of the chassis tilting frame and body with portions broken away to illustrate the connections of the body-moving cable therein.

FIG. 5 is a transverse sectional view through the tilting frame on the line 5—5, FIG. 3.

FIG. 6 is a transverse sectional view through the tilting frame and body sills on the line 6—6, FIG. 3.

FIG. 7 is a schematic view of the hydraulic system for the frame-tilting and body-moving mechanism.

Figure 1:
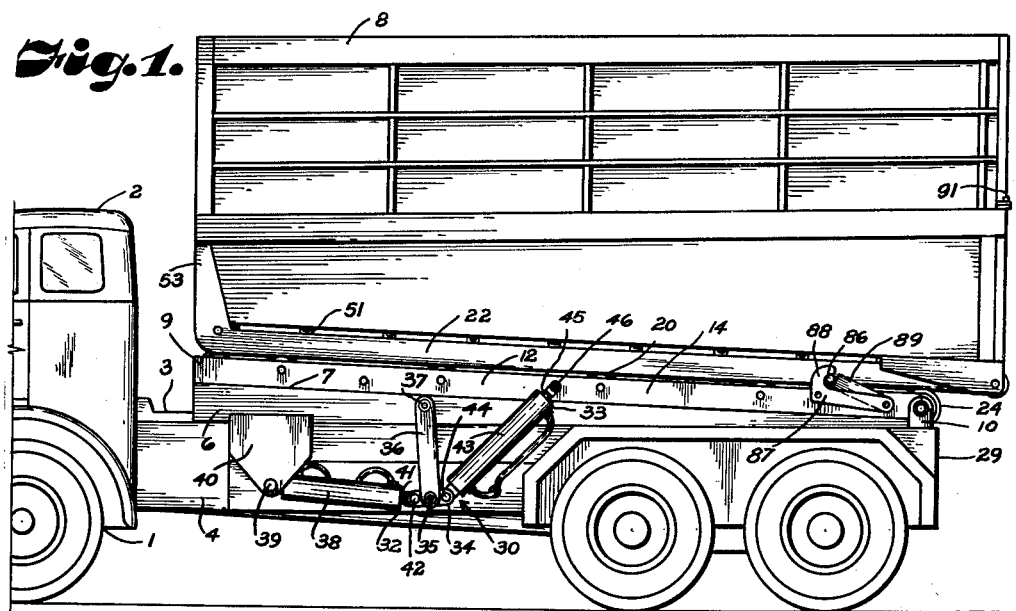
FIG. 1 is a partial side elevation of a truck with a body thereon for transportation in accordance with the invention.
Figure 2:
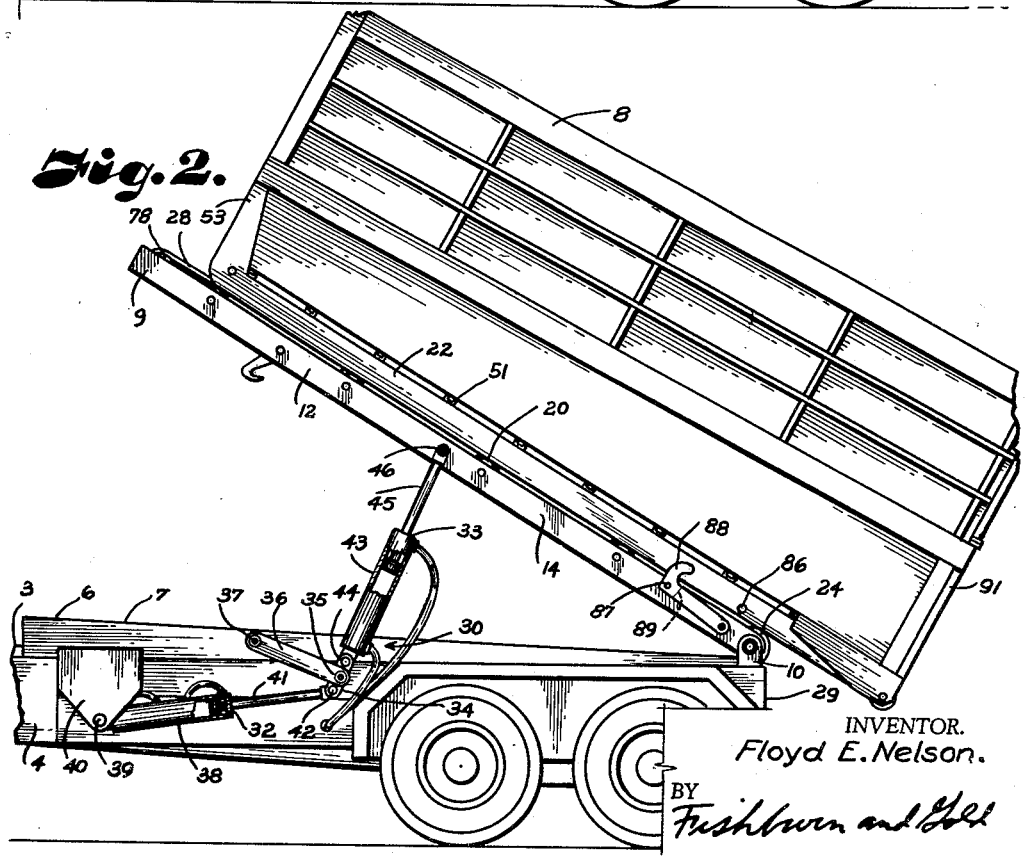
FIG. 2 is a partial side elevation of a truck chassis with a body or container thereon in tilted position and being unloaded therefrom.

Referring more in detail to the drawings:

1 designates a vehicle such as a truck having a cab 2 and a chassis 3 which includes spaced longitudinal frame members 4 and 5 suitably connected to form a rigid frame structure. In the illustrated structure, the frame members 4 and 5 have upper portions 6 with rearwardly inclined upper surfaces 7 to facilitate movement of a load-carrying body 8 as later described. However, the upper surfaces 7 may be normally horizontal or inclined forwardly if desired.

An elongated rigid tilting frame 9 has its rear end portion suitably supported in spaced upstanding bearing members 10 and 11 at the rear portions of the chassis frame members 4 and 5 respectively whereby the tilting frame 9 is suitably and pivotally supported for vertical swinging movement relative to said chassis. The tilting frame 9 has laterally spaced longitudinal members 12 and 13 preferably of structural members such as angle irons with one flange 14 of each arranged substantially in a vertical plane and the other flange 15 of each extending inwardly from the lower edge of the vertical flange 14, as illustrated in FIGS. 5 and 6. The tilting frame 9 also has transverse members 16, 17 and 18 arranged along the length thereof and secured to the side members to form a rigid structure. It is preferable that the member 16 be arranged at the forward end of the tilting frame, and the member 17 be intermediate the length of the side members, with the member 18 adjacent the rear ends thereof.

A plurality of spaced bearing members 19 are spaced longitudinally along the sides of the tilting frame and spaced from the flanges 14 to cooperate therewith in supporting a plurality of rollers 20 spaced longitudinally along the sides of the tilting frame and inwardly of the flanges 14 thereof. The rollers 20 preferably have flanges 21 at their inner ends to cooperate in defining a pair of tracks which are adapted to receive a pair of spaced skids 22 which are rigidly secured to the bottom of the truck body or container 8 or other load-carrying device adapted to be transported on the vehicle. The rear ends of the flanges 14 are preferably fixed to a transverse shaft 23 that has lateral end portions pivotally mounted in the bearing members 10 and 11 for pivotal mounting of the tilting frame 9. One or more rollers 24 are sleeved on the shaft 23 between the flanges 14 with said rollers 24 having flanges 25 for engagement by the skids 22 to aid in guiding same on and off of the tilting frame, there being a roller and flange arrangement at each side of the tilting frame and a center roller 26 having a peripheral groove 27 for receiving a cable 28 for operation therein in loading and unloading a container or body, as later described. The rollers 24 and the cable-receiving groove pulley or roller 26 are arranged and cooperate relative to a rear plate 29 on the truck chassis in the loading and unloading of load-carrying devices substantially in the same manner as described in the Nelson Patent No. 2,867,339 issued January 6, 1959.

The tilting frame 9 is preferably swung vertically by means of suitable extensible members arranged to occupy a minimum of vertical space when in load-carrying position and preferably of the double-acting type for positively controlling the fovement and tilt of the tilting frame under all types of loading or unloading positions. In the illustrated structure, there is a pair 30 of articulated extensible members located on each side of the truck chassis 3. The articulated pairs 30 of extensible members each include connected double-acting rams 32 and 33 with an intermediate pivotal connection 34 pivotally mounted as at 35 on one end of a link 36 having the other end pivotally connected as at 37 on to the chassis frame extension 6 substantially above the rod end of the cylinder 38 of the hydraulic ram 32 where said cylinder has its other end pivoted as at 39 to a bracket 40 extending laterally from the chassis frame member. The one or rod end of the hydraulic ram cylinder 38 has a piston rod 41 extending therefrom and pivotally connected as at 42 to the intermediate pivotal connection member 34. The hydraulic ram 33 of each pair of tilt frame actuators includes a cylinder 43 having one end pivotally mounted as at 44 on the pivotal connector 34 adjacent the link 36. A piston rod 45 extends from the other end of the cylinder 43 and it is pivotally connected as at 46 to the tilt frame 9 preferably to laterally extending members 47 arranged at the ends of the transverse member 17. The hydraulic rams 32 and 33 of each pair of tilt frame actuators are preferably connected into the hydraulic system whereby upon actuation of a valve 48 fluid pressure is simultaneously applied to the ends of each of the rams adjacent the pivotal connections of the cylinders for extensible movement of said rams. The relative extension of the rams 32 and 33 of each pair 30 will depend upon the pressure and the relative load or resistance to extension, and, in actual practice, it is found that when the tilting frame is in load-carrying position and raising pressure is applied to the actuators, the rams 32 will be extended first swinging the links 36 on the pivots 37 and bodily moving the rams 33 to start tilting movement of the tilting frame. Continued application of fluid pressure will continue to extend the ram 32 and extend the ram 33 to effect full tilting movement of the tilting frame 9. When it is desired to lower the tilting frame into load-carrying position, the valve 48 is actuated whereby fluid from the cylinders between the pistons and pivoted ends thereof is communicated with a reservoir 49, and fluid pressure from the pump 50 is applied to the other ends of the rams to effect contracting movement of the respective rams 32 and 33 and corresponding downward swinging movement of the tilting frame onto the chassis.

The body 8 or container adapted to be loaded and unloaded onto the vehicle has a plurality of spaced transverse members 51 connecting the skids 22 to form a rigid under structure for the body or container. The forward ends of the skids preferably are connected by a transverse cylindrical member 52 between plate members 53 that form abutments adapted to engage and move upwardly on the plate 29 at the rear of the chassis, the cylindrical member 52 aiding in positioning the cable 28 which has an eye-fitting or other suitable connector member 54 on the end thereof adapted to be engaged with a hook 55 or other member extending downwardly from the body between the skids adjacent the forward ends thereof, as illustrated in FIG. 4.

The cable 28 is moved during loading and unloading of the vehicle body 8 by means of actuators 56 which preferably lie substantially within the vertical height of the tilting frame 9. Said actuator, in the illustrated structure, includes spaced parallel hydraulic rams having cylinders 57 and 58 extending longitudinally of the tilting frame with ends 59 of said cylinders preferably secured to the transverse member 17. Piston rods 60 extend from the ends 59 of each of the cylinders through openings 61 in the member 17 toward the rear of the frame, said piston rods each being connected by pins 62 to a slide member 63 having sliding engagement with a guide member 64 extending longitudinally of the tilting frame from the intermediate member 17 to the rear transverse member 18, said guide member preferably being midway between the side members 12 and 13 of the tilting frame.

The slide member 63 preferably has spaced upper and lower plates 65 and 66 with laterally spaced pulleys 67 and 68 rotatably mounted therebetween. The respective end portions of the cylinders 57 and 58 are each preferably rigidly supported from the tilting frame members 12 and 13 respectively by means of arms 69. The ends 70 of the cylinders 57 and 58 adjacent the forward end of the tilting frame have spaced ears 71 connected by pins 72 to vertically spaced plates 73 and 74 of a header member 75 formed by the transverse member 16 and said plates 73 and 74. Laterally spaced cable-receiving pulleys 76 and 77 are mounted on the pins 72 adjacent the ends of the respective cylinders 57 and 58, and another grooved pulley 78 is supported on ears 79 extending from the transverse member 16 to rotatably mount said pulley 78 substantially on a vertical plane between the pulleys 76 and 77. The ears 79 extend beyond the plate 16 and are connected as at 80 to an adjustable member such as a turnbuckle 81, the other end of which is secured to a fitting 82 on the end 83 of the cable 28, that being the opposite end to the connector 54. The cable extends from the fitting 82 around the pulley 68 longitudinally along the side of the cylinder 58 over the pulley 77 transversely of the tilt frame and over the pulley 76 and then longitudinally of the cylinder 57 around the pulley 67 and then longitudinally of the tilt frame under and around the pulley 78 and then rearwardly of the tilt frame to the connector 54, as illustrated in FIGS. 3, 4, 5 and 6.

The rams composed of the cylinders 57 and 58 and the respective pistons and rods are preferably of the double-acting type with fluid being supplied thereto simultaneously for movement of the piston rods in the same direction whereby actuation of a valve 84 applies fluid pressure to the cylinders to effect extension of the piston rods therefrom moving the slide member 63 toward the rear portion of the tilt frame and moving the connector 54 forwardly relative to the tilt frame a distance substantially four times the extension of the cylinders in a movement tending to draw the body or container onto the tilting frame, as later described. When it is desired to allow the body to move off of the tilting frame, the valve 84 is manipulated whereby fluid is applied to the cylinders between the pistons and the ends 59 thereof and the other ends of the cylinders communicated with the reservoir whereby the slide 63 is moved to permit the cable to be drawn out by the body as it moves rearwardly on the tilt frame.

The sills 22 of the body preferably have laterally extending stop lugs 86 adapted to be engaged by latches 87 which have hook portions 88 and movable detents or arms 89 actuated by an hydraulic ram 90 to prevent the sills from moving rearwardly relative to the tilt frame except when such movement is desired. It is preferable that the ram 90 be arranged in the hydraulic circuit between the valve 84 and the cylinders 57 and 58 for releasing the latch arms 89 before movement of the piston rods and the cylinders for paying out of the cable 28. Other conventional and suitable safety latches may be utilized as desired.

In operating load-carrying equipment such as illustrated and described, and assuming the container or body 8 has been placed at a loading site, the truck or vehicle 1 is driven to the site and backed to a position wherein the rear end of the chassis is adjacent the forward end of the body 8. The valve 84 is then operated to supply fluid to the cylinders 57 and 58 for contracting the rams thereof, and the connector 54 is grasped and pulled rearwardly relative to the chassis over the roller 26 and thence rearwardly until it can be engaged with the hook 55 on the container 8. The valve 84 is then actuated to reverse the application of the fluid pressure to the other ends of the cylinders 57 and 58 to effect extension of the rams and thereby drawing of the cable to pull the connector 54 toward the chassis and forwardly of the tilting frame to thereby pull the forward end of the body or container until the members 53 engage the plate 29 and then further pulling on the cable will raise the forward end of the body or container until the skids 22 ride over the rollers 24. Further forward pulling on the cable will move the body forwardly relative to the tilt frame with the skids of the body being guided by the flanges 21 on the rollers 20. The forward movement is continued until the forward motion of the body is stopped by engagement of the lugs 86 with the hook members 88, at which time the latch arms 89 move upwardly to the rear of the lugs 86 to retain the body in position on the tilting frame 9. The connector 54 is left engaged with the member 55 whereby the cable 28 also tends to hold the body in position on the tilting frame 9. The truck is then driven to an area where the material is to be dumped from the body. Rear doors 91 on the container are released and the valve 48 actuated to apply fluid pressure to the pairs 30 of double-acting rams 32 and 33 to effect extension of same to tilt the tilting frame 9 upwardly together with the body 8 thereon whereby gravity will effect movement of the contents of the body through the rear opening normally closed by the doors 91. When the contents are dumped, the valve 48 is actuated to apply fluid pressure to the other ends of the rams 32 and 33 to positively swing the tilting frame and body downwardly into load-carrying position on the chassis, as illustrated in FIG. 1. The truck is then ready to be moved to any other desired site.

When it is desired to bodily remove the container or body 8 from the truck, the truck is driven to the desired site, and the valve 48 actuated to apply fluid pressure to the rams 32 and 33 to tilt the tilt frame 9, and then the valve 84 is actuated to supply fluid pressure to the cylinders 57 and 58 to effect contraction of same and also supply fluid to the ram 90 to release the latch members 89 whereby the body 8 will move rearwardly down the inclined tilting frame until the rear end of the body is engaged with the ground. The truck is then driven forwardly to move from under the body and the cylinders 57 and 58 controlled whereby the body moves over the rear end of the tilting frame and is lowered to the ground. The connector 54 is then disengaged from the member 55 and the valve 84 is actuated to extend the piston rods 60 from the cylinders 57 and 58 to thereby draw the cable and connector 54 back forwardly of the tilt frame and then fluid is supplied to the rams 32 and 33 to lower the tilt frame onto the chassis.

It will be readily apparent from the same loading, unloading and dumping operations that the body may be loaded and unloaded in both empty and full conditions, and that the tilting frame may be utilized in various angle positions with the actuator for the cable 28 to provide other manipulations with the body or container 8 for facilitating the self-loading and unloading of the vehicle.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a load-carrying apparatus having a wheel-supported chassis with an elongate frame having the rearward end portion thereof pivoted on the rearward end portion of the chassis for vertical swinging movement of the frame relative to the chassis, extensible means on said chassis and connected to said elongate frame for effecting raising and lowering movement of said elongate frame, said extensible means including articulated hydraulic rams with one end of said rams pivotally mounted on said chassis and the other end of said rams pivotally connected to said elongate frame, and a link having one end pivotally mounted on said chassis in spaced relation to said hydraulic rams and intermediate the respective pivotal mountings of the ends thereof on the chassis and the elongate frame, said link having the other end thereof pivotally connected to the articulated connection of said hydraulic rams whereby extension and contraction of one of said hydraulic rams swings the link and bodily moves the other of the hydraulic rams relative to said chassis and extension and contraction of said other of the hydraulic rams in cooperation with said bodily movement effects raising and lowering respectively of said elongate frame.

2. In a load-carrying apparatus having a wheel-supported chassis with an elongate frame having the rearward end portion thereof pivoted on the rearward end portion of the chassis for vertical swinging movement of the frame relative to the chassis, extensible means on said chassis and connected to said elongate frame for effecting raising and lowering movement of said elongate frame, said extensible means including an hydraulic ram having one end pivotally mounted on said chassis with said hydraulic ram extending rearwardly thereof, a link having one end pivotally mounted on said chassis in spaced relation to the pivotal mounting of said hydraulic ram, means pivotally connecting the other end of said hydraulic ram to the other end of said link, a second hydraulic ram having one end pivotally connected to said other end of said link, and means pivotally connecting the other end of said second hydraulic ram to said elongate frame in forwardly spaced relation to the pivotal mounting thereof on said chassis, said pivotal mounting of said one end of the link being intermediate the pivotal mountings of said one end of the first-named hydraulic ram on the chassis and the pivotal mounting of said other end of the second hydraulic ram on said elongate frame whereby said hydraulic rams form an articulated structure and extension and contraction of said hydraulic rams effect bodily movement of the second hydraulic ram relative to the chassis and raising and lowering respectively of said elongate frame.

3. In a load-carrying apparatus having a wheel-supported chassis with an elongate frame having the rearward end portion thereof pivoted on the rearward end portion of the chassis for vertical swinging movement of the frame relative to the chassis, articulated extensible means on each side of said chassis and connected to said elongate frame for effecting raising and lowering movement of said elongate frame, said articulated extensible means each including an hydraulic ram having one end pivotally mounted on a forward portion of said chassis with said hydraulic ram extending rearwardly thereof, a link having one end pivotally mounted on said chassis in spaced relation to the pivotal mounting of said hydraulic ram and above the other end of said hydraulic ram, means pivotally connecting the other end of said hydraulic ram to the other end of said link, a second hydraulic ram having one end pivotally connected to said other end of said link, and means pivotally connecting the other end of said second hydraulic ram to said elongate frame in forwardly spaced relation to the pivotal mounting thereof on said chassis whereby extension and contraction of said hydraulic rams swing said link and effect bodily movement of said second hydraulic ram relative to the chassis and raising and lowering respectively of said elongate frame.

4. In a load-carrying apparatus having a wheel-supported chassis with an elongate frame having the rearward end portion thereof pivoted on the rearward end portion of the chassis for vertical swinging movement of the frame relative to the chassis with spaced longitudinal tracks on said frame, a pair of load-supporting skids adapted to be guided by said spaced longitudinal tracks of said frame, a pulley on the elongate frame at the forward end portion thereof, an elongate flexible member having one end fixed relative to said elongate frame and the other end extending forwardly over said pulley and then rearwardly, a connecting means adjacent the forward portion of said skids for connection of the other end of said flexible member thereto, extensible means within the confines of said elognate frame and having one end fixed relative to said elongate frame and the other end movably engaged with said flexible member intermediate the ends thereof whereby extension of said extensible means moves said other end of the flexible member and said skids forwardly on said tracks of the elongate frame, and extensible means on said chassis and connected to said elongate frame for effecting raising and lowering movement of said elongate frame.

5. A loading and unloading apparatus for vehicle bodies comprising, a wheel-supported chassis including an elongate frame, a second elongate frame having a pair of track-forming sides, means pivotally mounting the rearward portion of the second elongate frame on the rearward end of the elongate frame of the chassis for vertical swinging movement to and from overlying engagement therewith, extensible means pivotally connected with said chassis frame and said second frame for effecting raising and lowering movement of said second frame, a pair of load-supporting skids adapted to be guided by said spaced track-forming portions of the second frame, a pulley on the forward portion of said second elongate frame, an elongate cable, means adjacent the forward end of said skids adapted to be connected to one end of said cable with the cable extending forwardly over said pulley and then rearwardly relative to the second elongate frame, a pair of hydraulic rams arranged longitudinally of said second elongate frame in parallel relation, means fixing one end of said pair of hydraulic rams relative to said second elongate frame and adjacent the forward end thereof, means connecting the other ends of the hydraulic rams whereby extension of said hydraulic rams moves said connecting means rearwardly relative to said second elongate frame, and spaced pulleys at each end of each hydraulic ram, said cable extending over and engaged with said spaced pulleys and having its other end fixed relative to said one end of said hydraulic rams whereby the length of extensible movement of the pair of hydraulic rams moves said spaced pulleys relative to each other and moves said one end of the cable a multiple of the length of the extension of said hydraulic rams for effecting movement of the skids longitudinally of the second elongate frame.

6. In a load-carrying apparatus having a wheel-supported chassis with an elongate frame having the rearward end portion thereof pivoted on the rearward end portion of the chassis for vertical swinging movement of the frame relative to the chassis with spaced longitudinal tracks on said frame, articulated extensible means on said chassis and connected to said elongate frame for effecting raising and lowering movement of said elongate frame, said articulated extensible means including an hydraulic ram having one end pivotally mounted on said chassis, a link having one end pivotally mounted on said chassis in spaced relation to the pivotal mounting of said hydraulic ram, means pivotally connecting the other end of said hydraulic ram to the other end of said link, a second hydraulic ram having one end pivotally connected to said other end of said link, means pivotally connecting the other end of said second hydraulic ram to said elongate frame in spaced relation to the pivotal mounting thereof on said chassis whereby extension and contraction of said hydraulic rams effect bodily movement of said second hydraulic ram relative to the chassis and raising and lowering respectively of said elongate frame, a pair of load-supporting skids adapted to be guided by said spaced track portions of said elongate frame, a pulley on said elongate frame adjacent the forward end thereof, an elongate cable, means adjacent the forward end of said skids adapted to be connected to one end of said cable with the cable extending forwardly over said pulley and then rearwardly relative to the elongate frame, a pair of parallel hydraulic rams arranged longitudinally of said elongate frame, means fixing one end of said pair of parallel hydraulic rams relative to said elongate frame and adjacent the forward end thereof, guide means fixed on said elongate frame and extending longitudinally thereof, slide means slidably engaged with said guide means and movable therealong, means connecting the other ends of said pair of parallel hydraulic rams to said slide means whereby extension of said pair of hydraulic rams moves the slide means rearwardly relative to said elongate frame, spaced pulleys at each end of each hydraulic ram of said parallel pair, said cable extending over and engaged with said spaced pulleys and having its other end fixed relative to said one end of said pair of hydraulic rams whereby the length of extensible movement of the pair of hydraulic rams moves said spaced pulleys relative to each other and moves said one end of the cable a multiple of the length of the extension of said pair of hydraulic rams for effecting movement of the skids longitudinally of the elongate frame, stop means on the track-forming sides of the elongate frame for engaging said skids to prevent rearward movement of said skids, and means connected with said stop means and operable to swing same into skid-releasing position.

References Cited in the file of this patent

UNITED STATES PATENTS

| | | |
|---|---|---|
| 1,633,364 | Carvalho | June 21, 1927 |
| 2,319,840 | Barrett | May 25, 1943 |
| 2,530,350 | Ehlert | Nov. 14, 1950 |
| 2,707,654 | Williamsen | May 3, 1955 |
| 2,867,339 | Nelson | Jan. 6, 1959 |